US007513423B2

(12) United States Patent
Kocznar et al.

(10) Patent No.: US 7,513,423 B2
(45) Date of Patent: Apr. 7, 2009

(54) DEVICE FOR CONTROLLING ACCESS IN A PASSAGE LANE

(75) Inventors: Wolfram Kocznar, Innsbruck (AT); Josef Fischer, Hallein (AT)

(73) Assignee: Axess AG, Wals-Siezenheim (AT)

( * ) Notice: Subject to any disclaimer, the term of this patent is extended or adjusted under 35 U.S.C. 154(b) by 458 days.

(21) Appl. No.: 11/149,953

(22) Filed: Jun. 10, 2005

(65) Prior Publication Data

US 2006/0027649 A1 Feb. 9, 2006

(30) Foreign Application Priority Data

Jun. 11, 2004 (AT) ............................. A 1005/2004
Aug. 30, 2004 (AT) ............................. A 1453/2004

(51) Int. Cl.
*G06K 5/00* (2006.01)

(52) U.S. Cl. .......................... 235/382; 235/384; 705/13

(58) Field of Classification Search ................. 235/382, 235/384, 375, 380, 449, 492; 705/13
See application file for complete search history.

(56) References Cited

U.S. PATENT DOCUMENTS 6,347,486 B1 2/2002 Badillet
6,352,206 B1 * 3/2002 Ashley et al. ............... 235/475
6,617,960 B1 9/2003 Fischer et al.
6,749,118 B2 * 6/2004 Kobayashi et al. .......... 235/449
6,874,685 B1 * 4/2005 Moreau et al. .............. 235/384
6,940,406 B2 * 9/2005 Sata ........................... 340/552
2006/0101716 A1 * 5/2006 Vandyck et al. ................ 49/35

FOREIGN PATENT DOCUMENTS

| | | | |
|---|---|---|---|
| AT | 003 694 | | 6/2000 |
| EP | 1 288 430 | A | 3/2003 |
| NL | 1 021 977 | C2 | 5/2004 |
| WO | WO 94/25939 | | 11/1994 |
| WO | WO 00/04511 | | 1/2000 |
| WO | WO 2004/034335 | | 4/2004 |

* cited by examiner

*Primary Examiner*—Edwyn Labaze
(74) *Attorney, Agent, or Firm*—Henry M. Feiereisen; Ursula B. Day

(57) ABSTRACT

In a device for controlling access in a passage lane, particularly for controlling people, comprising a housing for receiving electronic components, particularly comprising a reader for tickets, the housing forming a lateral delimitation of the passage lane, it is suggested, for simple and rapid maintenance and putting into operation, that the housing have housing openings (3) directed toward the passage lane (2), the housing opening (3) be closable by covers (4), and at least two of the covers (4) be implemented as supports for electrical and/or mechanical modular components, particularly an identification module for tickets, a controller component for controlling an access control, a data transfer module for data exchange with further electrical and/or mechanical components, and/or a display module for displaying information, the particular modular components being positioned on an interior of the cover (4) implemented as a support, and being replaceable together with the cover (4).

28 Claims, 5 Drawing Sheets

DEVICE FOR CONTROLLING ACCESS IN A PASSAGE LANE

The present invention relates to a device for controlling access in a passage lane, particularly for controlling people, comprising a housing for receiving electronic components, particularly comprising a reader for tickets, the housing forming a lateral delimitation of the passage.

Devices of the species according to the present invention are used, for example, for checking tickets on ski lifts, in stadiums, and the like.

Such a device having a turnstile is known, the turnstile being attached to the ground on metal pipes. A support is mounted in turn on the turnstile housing, which supports a ticket reader. This ticket reader comprises a housing for the required electronic components of a magnetic card reader. Furthermore, an antenna for contactless chip cards is attached to the turnstile. This device has the disadvantage that card reader, antenna, and turnstile must be electrically connected to one another in a complex way and these connections are very susceptible to faults. In case of malfunction, the search for the faults is difficult and repairing the faults is complex.

The object of the present invention is therefore to specify a device for controlling access in a passage lane of the type cited at the beginning, using which the cited disadvantages may be avoided, and which may be maintained and/or put into operation rapidly and simply and as much as possible even by less qualified people.

This is achieved according to the present invention in that the housing has housing openings directed toward the passage lane, the housing openings are closable by covers, and at least two of the covers are implemented as supports for electrical and/or mechanical modular components, particularly an identification module for tickets, a controller component for controlling an access control, a data transfer module for data exchange with further electrical and/or mechanical components, and/or a display module for displaying information, the particular modular components being positioned on an interior of the cover implemented as a support and being replaceable together with the cover.

In this way, in case of fault, the particular components may be replaced rapidly and easily, by changing the cover together with the associated electronic parts. This change is performed externally, without the device itself having to be disassembled. It is thus possible for even less qualified people to make the device usable again rapidly in case of fault. It may thus also be ensured that all those who are to be controlled by the device also actually pass the device.

In a refinement of the present invention, the housing openings may be closable by at least one cover using at least one quick-acting closure. Especially rapid and simple exchange of components, possibly even without using tools, is thus possible.

According to a further embodiment of the present invention, the housing may comprise a vertically extending tubular profile, which is anchored in a way known per se on a floor and/or above the floor of the passage lane, the housing openings particularly being positioned in the tubular profile. A housing which is very simple to manufacture and dimensionally stable may thus be provided.

According to yet another embodiment of the present invention, the housing, particularly the tubular profile, may have at least three housing openings, a first housing opening allowing access to the electrical connections leading to the periphery, the cover for closing a second housing opening carrying a display, and the cover for closing a third housing opening carrying an identification module. Most applications may be covered using three housing openings and the associated covers.

A variation of the present invention may be that the housing, particularly the tubular profile, has an antenna, particularly a long-range antenna, and/or connection points for an antenna, particularly a long-range antenna, for detecting electronic, contactless transponders. Contactless transponders may thus be detected easily, through which controlling large streams of people is possible even more rapidly and smoothly.

In a further embodiment of the present invention, the long-range antenna may extend parallel to the passage direction, and may have a supporting frame having attachment means for the connection points to the tubular profile, the frame holding two spaced plates and the plate facing away from the passage lane having an electrically conductive coating for shielding. A simple and visually appealing construction of an antenna is thus achieved, the antenna only being able to detect on one side due to the shielding.

In another possible embodiment, the cross-section of the housing, which is anchored in the floor in a known way, may run essentially degressively in outline from a middle to a first end and/or a second end, and have an essentially level cover plate, and a card reader may be positioned below the cover plate of the housing on at least one of the ends, the feed direction of an authorization card enclosing an acute angle to the passage direction. Such an implementation makes it easier for those passing to understand and prevents avoidable obstructions.

Furthermore, the present invention relates to a device for controlling access in a passage lane, particularly for controlling people, comprising a housing for receiving electronic components, particularly comprising a reader for tickets, preferably a card reader, which checks the validity of an entrance card.

Devices of the species according to the present invention are used, for example, for checking tickets on ski lifts, in stadiums, and the like.

Such a device having a turnstile is known, the turnstile being attached to the floor on metal pipes. A support is in turn mounted on the turnstile housing, which supports a ticket reader. This ticket reader comprises a housing for the required electronic components of a magnetic card reader. In addition to the complex construction of such a device for access control, the ergonomics are inadequate for those passing. Pieces of baggage in particular always get hung up on parts of the rotating barrier.

Another known rotating barrier uses a housing made of sheet steel, the card reader being installed in the front side (viewed in the passage direction). Such rotating barriers always result in problems in practice, since especially with multiple accesses, the person passing feeds the card in lane A and attempts to pass in lane B.

The object of the present invention is therefore to specify a device for controlling access in a passage lane, using which the cited disadvantages may be avoided, and with which those passing may be controlled without obstruction and rapidly.

This is achieved according to the present invention in that the cross-section of the housing, anchored in a way known per se in the floor, runs essentially degressively in outline from a middle to a first end and/or second end, and has an essentially level cover plate, and a card reader is positioned below the cover plate of the housing on at least one of the ends, the feed direction of an authorization card enclosing an acute angle to the passage direction.

Such an implementation makes understanding easier for those passing and prevents avoidable obstructions.

According to a further embodiment of the present invention, the housing may comprise a lock/release mechanism, particularly in the function of a rotating barrier, the lock/release mechanism being activated by the card reader. The device according to the present invention may thus be used for blocked access authorization checking.

In this context, in a refinement of the present invention, the housing may have two stand feet positioned on the ends and a bridge connecting the stand feet, and the at least one card reader may be positioned in a recess of the housing. A more stable construction is thus possible, which has an oblong shape, and is thus well suitable for separating streams of people.

In a refinement of the present invention, the housing may have a first curved longitudinal side and a second curved longitudinal side viewed in outline, the housing having a convex central part viewed in cross-section. A simpler construction is thus provided, an acute angle to the passage direction in the region of one of the ends being able to be ensured easily through the curved elements.

According to a further embodiment of the present invention, the housing may have multiple card readers on the ends, and each card reader may activate the lock/release mechanism, particularly the rotating barrier, upon actuation of a passage direction assigned thereto. Multiple lanes may thus be controlled.

In a variation of the present invention, a rotating barrier acting toward the first longitudinal side and/or toward the second longitudinal side may be positioned on the bridge of the housing. Effective access control and/or restriction is thus possible.

In a further embodiment of the present invention, the card reader may include a card slot, which is larger than the ticket provided for operation, and a barcode scanner may be positioned above the card slot, which is provided for scanning an insertion region for the ticket, the card slot protruding at least partially out of the surface of the housing, particularly the stand feet. This supports the rapid and uncomplicated insertion of cards and tickets into the card reader.

According to a further implementation of the present invention, the card slot may have laterally recessed jaws, so that tickets may be inserted or pulled through. This supports the rapid and simple insertion or pulling through of cards and tickets in or through the card reader, respectively.

According to a further embodiment of the present invention, the ticket reader may be implemented as an insert module, the card slot and/or the barcode scanner being attached to a mounting plate, the mounting plate being provided as a cover for closing a recess of the housing. A simpler and more flexible construction, as well as simple and uncomplicated maintenance of the device, are thus provided.

A variation of the present invention may be that a separate card reader is positioned in the passage direction in front of the associated lock/release mechanism, particularly the rotating barrier, for every passage direction to be checked. The device may thus be used fully in every passage direction.

Furthermore, the present invention relates to an electronics support for use in a device for controlling access, particularly for a device according to the present invention for controlling access.

Using electronic circuits and/or controllers in devices for controlling access is known, these being positioned permanently wired in the housing of a known device of this type.

Devices of this type have the disadvantage that in the event of a fault of the electronics, the fault must be found and possibly repaired by an appropriately trained and/or complement expert at the location it occurs, therefore, directly at the device for controlling access, before the device for controlling access is functional again. Delays in controlling and/or preparing for departure may thus occur, which may result in annoyance and anger in those affected, and also in financial losses and/or compensatory demands against an operator.

The object of the present invention is therefore to specify an electronics support for use in a device for controlling access of the type cited at the beginning, using which the cited disadvantages may be avoided, and which allows rapid and uncomplicated maintenance and/or putting into operation of a device for controlling access, as much as possible even by less qualified people.

This is achieved according to the present invention in that the electronics support comprises a cover for a housing opening, an electronics module being positioned on an interior of the cover facing toward the housing opening, the electronics support being provided for rapid, simple, and flexible removal and positioning in the housing opening.

In this way, in the event of a fault of the electronics and/or an electronics module, the cover and/or the electronics support may be replaced easily with a replacement cover, through which the device for controlling access is usable again immediately or after only a short interruption.

According to a further implementation of the present invention, the present invention may be implemented as an electronic control unit, the electronics module being implemented as the controller for the electronic control unit. Defective control units may thus be replaced rapidly and easily.

In this context, in a refinement of the present invention, the cover may have an opening for receiving a display. Defective displays may thus be replaced rapidly and easily.

In a refinement of the present invention, it may be implemented as a chip card reading module, the electronic module being implemented as the read electronics for contactless chip cards, the read electronics being connectable to an antenna, particularly via plug-in contacts.

In a variation of the present invention, it may be implemented as a barcode read module, the electronic module being implemented as the read electronics for barcodes, the cover having a recess for inserting barcode tickets. Defective barcode read modules may thus be replaced rapidly and easily.

The present invention will be described in greater detail with reference to the attached drawing, in which especially preferred embodiments are illustrated.

Figure 1:
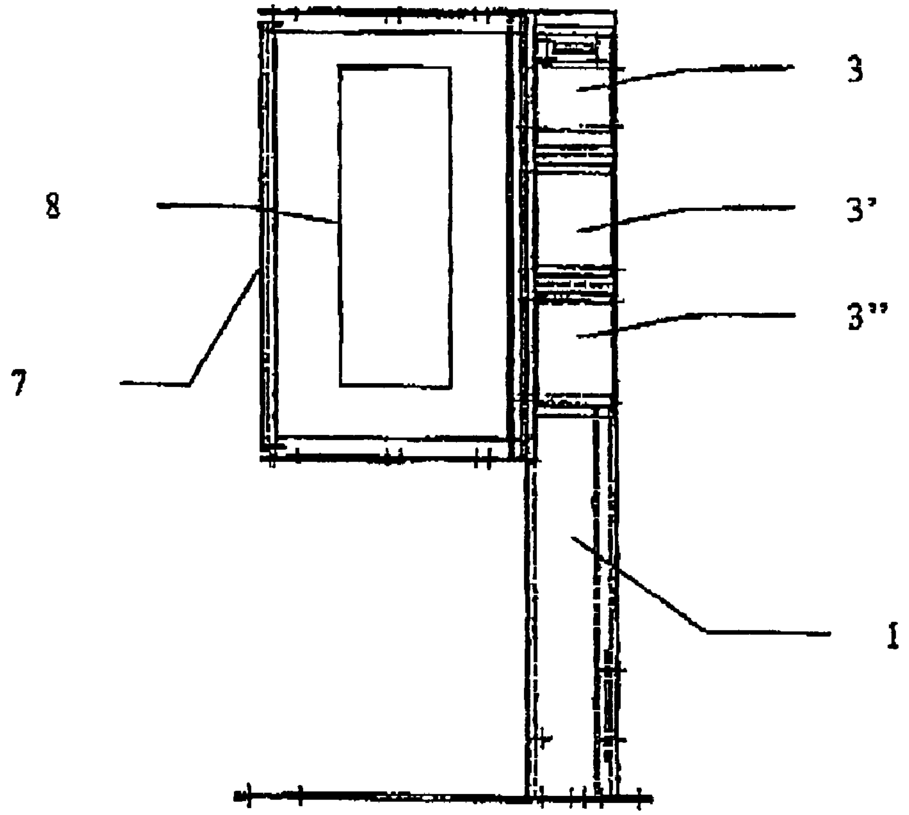
FIG. 1 shows a first embodiment of a device according to the present invention in outline from the side.

FIGS. 1 through 6 show a first preferred embodiment of a device for controlling access in a passage lane, particularly for controlling people, comprising a housing for receiving electronic components, particularly comprising a reader for tickets, the housing forming a lateral delimitation of the passage lane, the housing having housing openings 3 directed toward the passage lane 2, the housing openings 3 being closable by covers 4, and at least two of the covers 4 being implemented as supports for electrical and/or mechanical modular components, particularly an identification module for tickets, a controller component for controlling an access control, a data transfer module for data exchange with further electrical and/or mechanical components, and/or a display module for displaying information, the particular modular components being positioned on an interior of the cover 4 implemented as a support, and being replaceable together with the cover 4.

Figure 3:
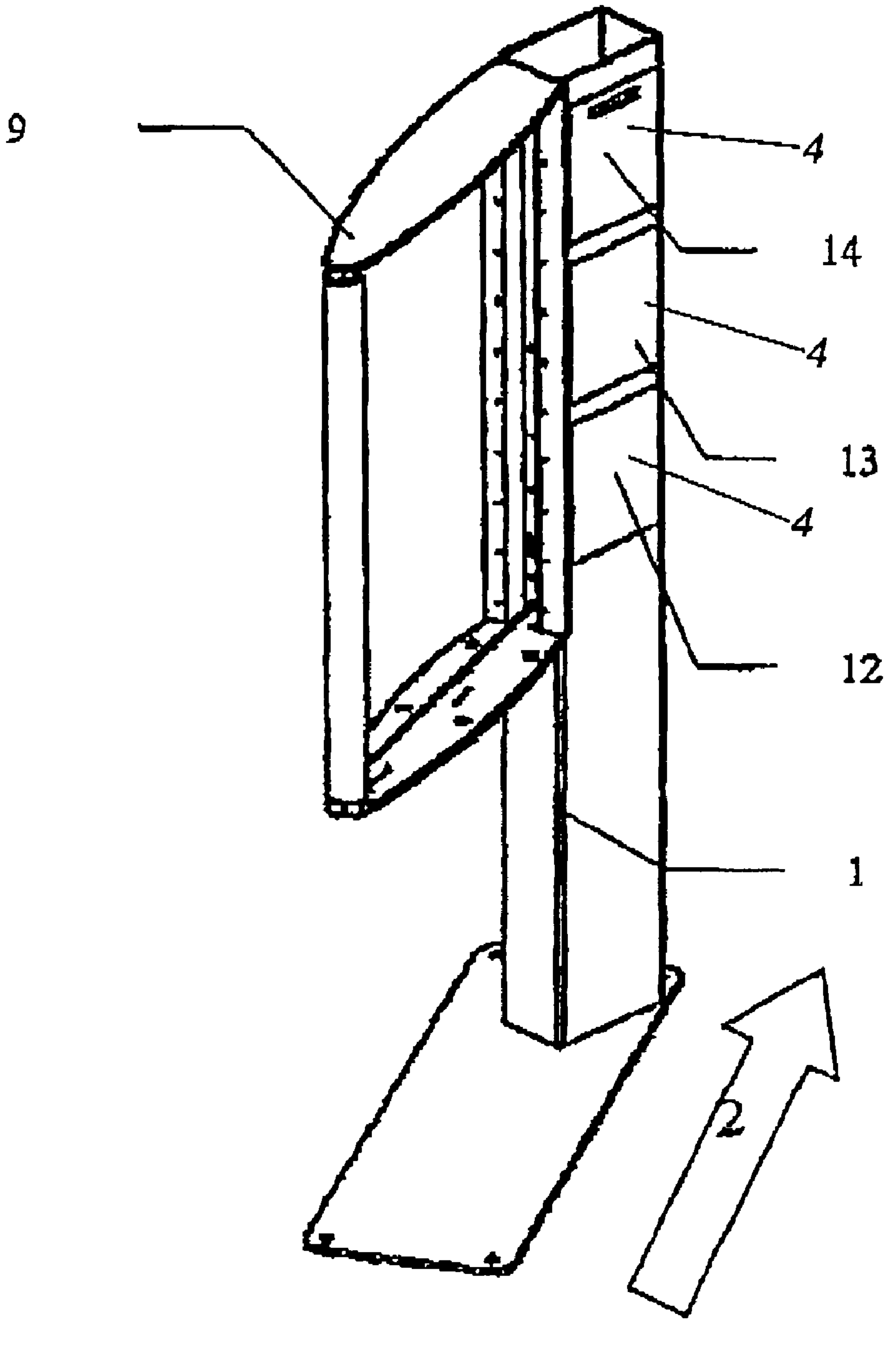
FIG. 3 shows a device as shown in FIG. 1 in axonometric illustration.
Figure 4:
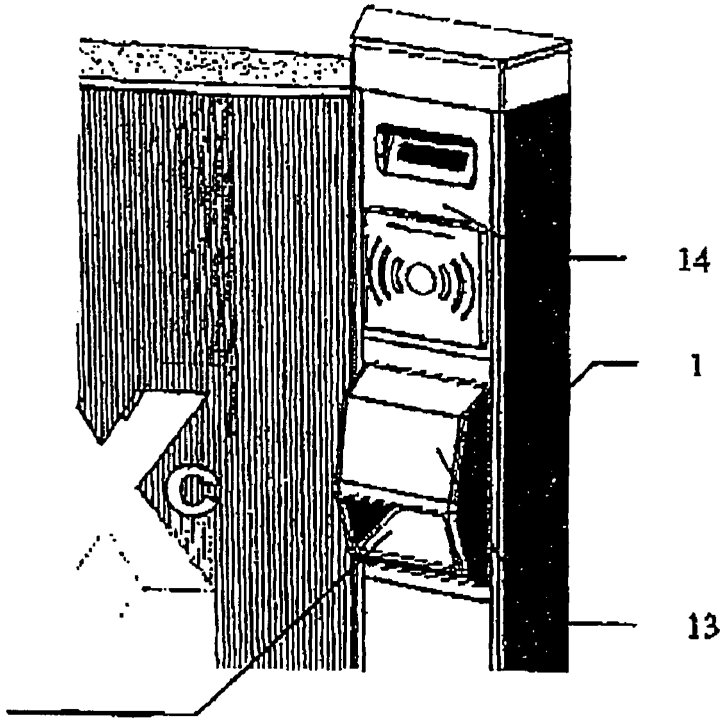
FIG. 4 shows a detail of a device as shown in FIG. 1 in axonometric illustration.
Figure 5:
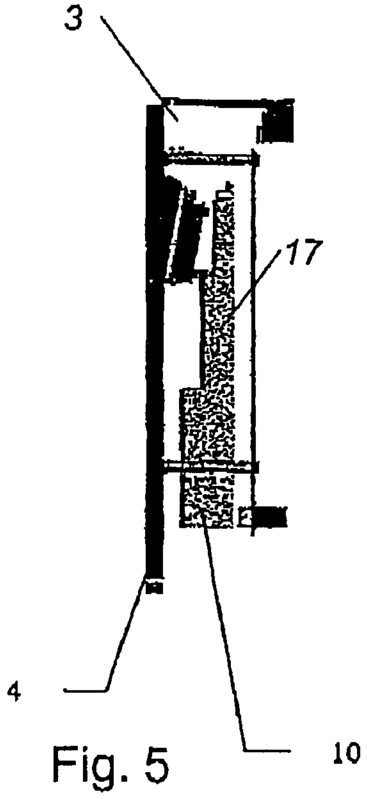
FIG. 5 shows the cover and an electronics support of a device as shown in FIG. 1 in a sectional illustration.
Figure 6:
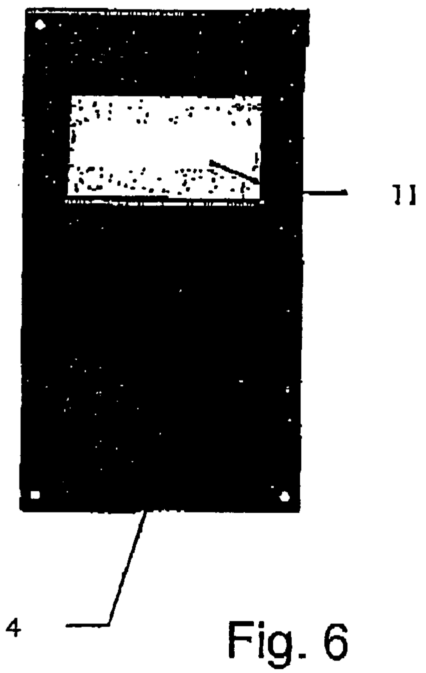
FIG. 6 shows a cover of a device as shown in FIG. 1.

FIG. 3 and/or FIG. 1 shows a device according to the present invention. This comprises a housing, which is especially preferably formed by a preferably vertically extending tubular profile 1, particularly a shaped tube, as shown. The tube 1 is preferably made of metal, but may also be made of plastic, composite materials, or wood. Even other embodiments, particularly slanted tubes or massive cubes, may be provided.

At least one housing opening 3 is provided in the housing, which is intended to be closed using at least one cover 4. In this case, at least one of the covers 4 is implemented as an electronics support for electrical and/or mechanical components of an identification module, the particular components being replaceable together with the cover 4.

FIG. 1 shows the device having removed covers 4, so that the preferably three housing openings 3, 3', 3" are visible.

The at least one cover 4 is preferably made of metal, particularly a metal alloy including aluminum, steel, and/or titanium, but may also be manufactured from plastics, such as such as ABS or acrylics, and above all from composite materials, such as glass-fiber reinforced plastics or carbon-fiber reinforced plastics. The cover 4 may also be produced from wood or glass.

Covers 4 according to the present invention may be connected to the housing using detachable fasteners. In particular, the cover 4 may be connected to the housing using screws and/or using quick-acting closures, such as those in the form of bayonet closures, quarter-turn closures, crimp closures, lever closures, folding bars, rotating bars, snap closures, or similar things.

A device according to the present invention is preferably intended for delimiting a passage lane 2. The tubular profile 1 has three housing opening 3 directed toward the passage lane 2 in the first preferred embodiment.

A frame 9 may be attached to the housing, particularly the tubular profile 1, using preferably removable fasteners, particularly screws, rivets, quick-acting closures, or the like, which may be provided with two spaced plastic plates (not shown). The frame 9 may, however, also be welded or glued to the housing or implemented in one piece.

In this case, the plates may be used as a cover for an antenna system positioned in the interior of the space formed by the plates. Therefore, an antenna 7, particularly a tubular antenna 8, may be positioned in the interior of the space formed by the plates, tubular profile and plates being able to form a long-range antenna 7. Using an antenna 7 of this type, for example, contactless tickets or transponders, such as RFID transponders, may be detected and/or queried or written. Furthermore, an antenna 7 having a directional characteristic may be used in order to only detect a certain region. In order to locally delimit the radiation emitted by the antenna 7, a shield from electromagnetic radiation, particularly a conductor, above all conducting sheet metal, which is preferably connected to a defined electrical potential and/or to ground, may be provided in the region of the antenna 7, preferably behind antenna 7 in the region which is not to be detected by the antenna 7.

One of the housing openings 3, preferably the uppermost, may be closed using a cover 4, 14, which carries a controller 10 for controlling the device for access control on its interior. Furthermore, an opening may be provided in the cover 4, 14 in which a display 11 for displaying information may be positioned and/or which may be provided for positioning such a display. In the case of a malfunction, the cover 4, 14 may be removed by opening the preferably provided quick-acting closures and replaced with the entire electronic system 10. The fault search and repair is thus significantly simplified and accelerated.

A cover 4, 13, which carries a read module for barcode tickets on its interior, may preferably be positioned in the middle of the three housing opening 3 of the tubular profile 1 according to the first referred embodiment. The cover 4, 13 itself may have an opening 16, so that barcode tickets may be inserted. In this case as well, if there is a fault, the entire module—cover 4, 13 having barcode reader—may be replaced immediately and easily. The lower housing opening 3" may be closed by a cover 4, 12 which carries an RFID read module (not shown) on its interior.

The connections between the electronic modules 17 and/or the equivalent electronic components may be produced easily by a cable harness which runs and is protected in the interior of tubular profile 1. Interfaces for the individual electronic modules may be provided for a cable harness of this type in this case.

Faults in one of the components are simple to repair, in that the particular cover 4, 12, 13, or 14 is removed and replaced with a replacement module 17 including a cover 4.

Tubular profile 1 and antenna 7 may simultaneously also form the lateral delimitation of the passage lane 2.

The covers 4 for the housing openings 3 according to the present invention form electronics supports together with the electronic module 17 mounted thereon, an electronic module 17 according to the present invention being positioned on an interior of the covers 4 facing toward the housing opening 3, the electronic carrier being intended for rapid, simple, and flexible removal and positioning in the housing opening 3. The at least one electronic module 17 is preferably connected to the cover 4 using spacers in this case. Through the spacers, the electronic module 17 is pushed sufficiently far away from the interior of the cover that the electronics have sufficient space.

Electronic modules 17 which are implemented as controllers 10 for electronic control, as chip card read modules 12, or as barcode read modules 13 are preferably provided. Depending on the type of application and/or the electronic module 17 positioned on the cover 4, at least one opening, for positioning a display and/or a ticket feed opening, for example, may be positioned in the cover 4.

The different electronic modules 17 are preferably connected and/or contacted via plug-in contacts with a cable harness and/or bus system preferably positioned in the housing.

FIGS. 7 through 10 show an especially preferred embodiment of a device for controlling access in a passage lane, particularly for controlling people, comprising a housing for receiving electronic components, particularly comprising a reader for tickets, preferably a card reader, which checks the validity of an entry card, the cross-section of the housing 21, which is anchored in a way known per se in the floor, running essentially degressively in outline from a middle to a first end 23 and/or second end 23' and having an essentially level cover plate 27, and a card reader 22 being positioned below the cover plate 27 of the housing 21 on at least one of the ends 23, 23', the feed direction 35 of an authorization card 30 enclosing an acute angle to the passage direction 29.

The housing 21 may comprise all features of the first preferred embodiment of the present invention.

Figure 7:
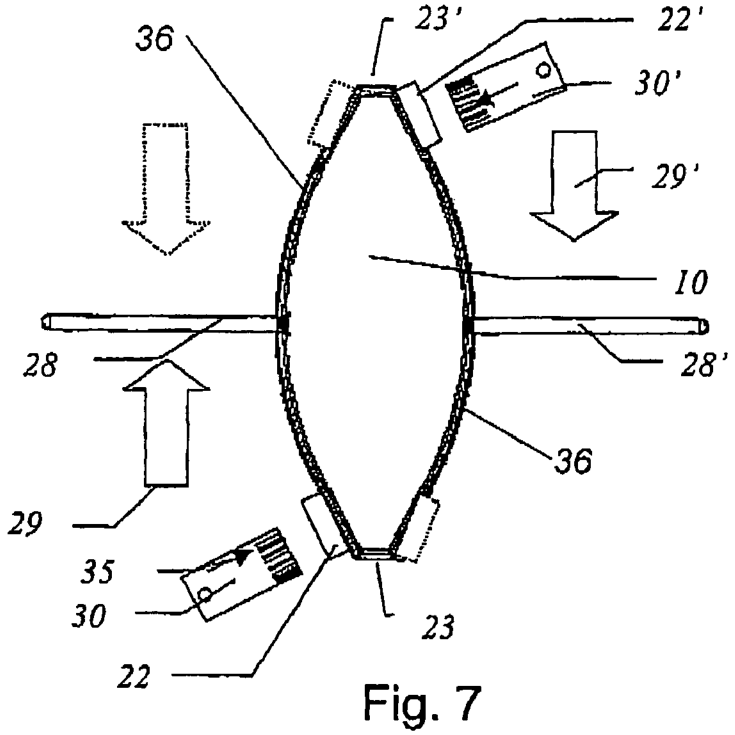
FIG. 7 shows a second preferred embodiment of a device according to the present invention in outline.
Figure 8:
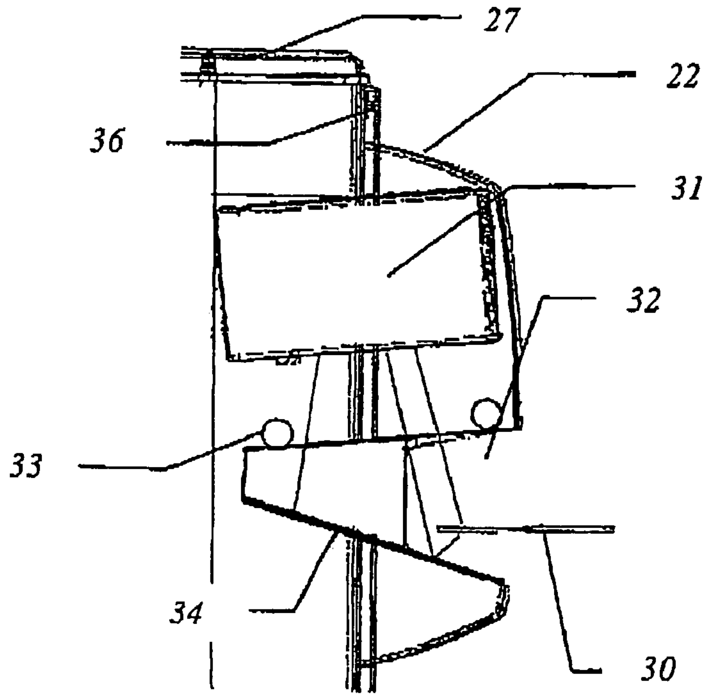
FIG. 8 shows a detail of a device as shown in FIG. 7 in a sectional illustration.

FIG. 7 shows a top view of an especially preferred embodiment of a device according to the present invention. The degressive course of the cross-section of the outline of the housing 21 may be seen clearly. In this preferred embodiment, the cross-section is formed by two symmetrically curved longitudinal sides 36, these forming a convex cross-section. Other cross sections may also be provided, for example, having longitudinal sides 36 running partially linearly from the middle to the ends. In the preferred embodiment, the housing 21 is implemented symmetrically. However, an asymmetrical implementation may also be provided.

Figure 9:
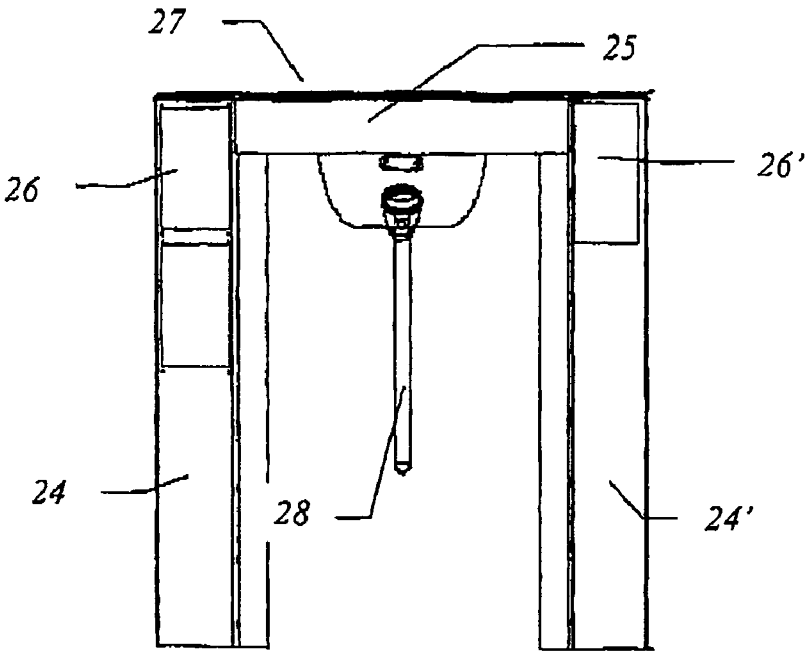
FIG. 9 shows a device as shown in FIG. 7 in a side view.
Figure 10:
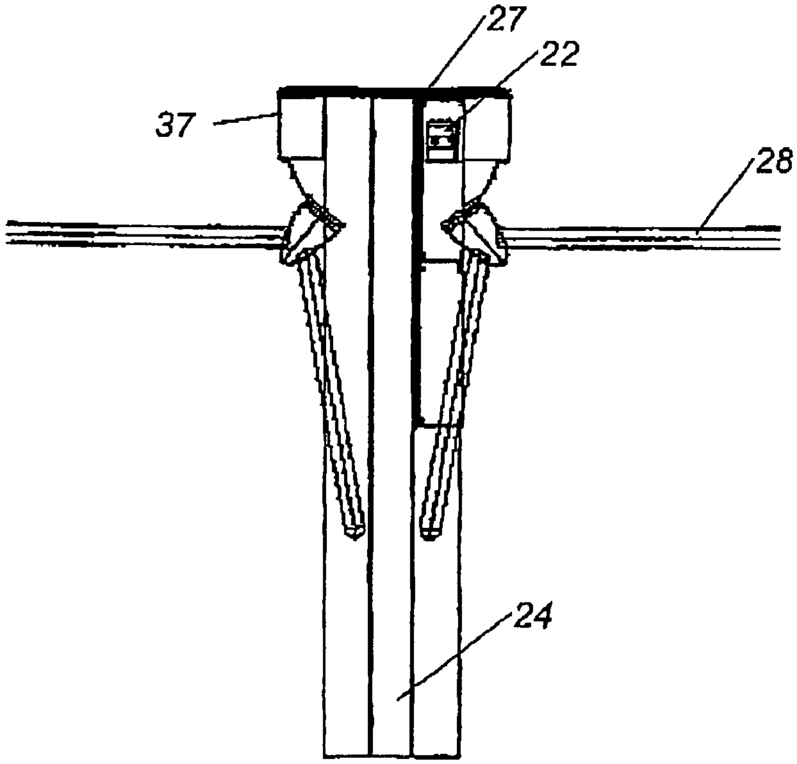
FIG. 10 shows a device as shown in FIG. 7 in a front view.

In the preferred embodiment shown in FIGS. 7, 9, and 10, a lock/release mechanism is provided, which is formed in the embodiment shown by a rotating barrier 28 and/or turnstile mechanism. Any other form of a lock/release mechanism and/or a rotating barrier 28 deviating from the image may also be provided. The rotating barriers 28 and/or turnstile mechanisms, which preferably act to the left and the right, are positioned centrally in the preferred embodiment, but may also be provided at other locations.

Two passage lanes thus arise, which are identified here by 29 and 29'. This device is especially suitable for access regions in which the access and the exit must be controlled. In regions having higher visitor frequency, where one passage lane 29, 29' in each direction is insufficient, the device may be positioned multiple times, however, it is also conceivable for both passage lanes 29, 29' to be operated in one direction.

The device may also be equipped with only one rotating barrier 28.

A card reader 28 may be positioned on one end, the feed angle 35 for the access ticket 30 advantageously enclosing an acute angle to the passage direction 29, 29'. Someone passing by is thus not obstructed by the card reader 22, since the housing 21 is implemented as narrower in this region, "incorrect" feeding of the ticket 30, i.e., usage of the wrong lane, also being able to be prevented.

Preferably, a further card reader 22' is positioned at an acute angle to the passage direction 29' on the second longitudinal side of the housing 21 on the diametrically opposite end 23'. Further card readers 22 may also be provided. These are shown with dashed lines in FIG. 7. A device of this type may be used for two passage lanes 29 having up to four passage directions without any obstruction.

FIG. 9 shows a side view of the housing 21 of the second especially preferred embodiment which has two stand feet 24 and 24' that are attached to the floor. The stand feet 24 and 24' are connected by a bridge 25 which is terminated by a level cover plate 27. Only one stand foot 24 and/or a larger number of them may also be provided. One of the turnstile mechanisms 28 is indicated in the middle of the bridge 25. The stand feet 24 have recesses 26 and 26' positioned below the cover plate 27, which are intended to receive the card reader 22. FIG. 10 represents a frontal view—seen in the passage direction—of the same preferred embodiment of the device.

Figure 2:
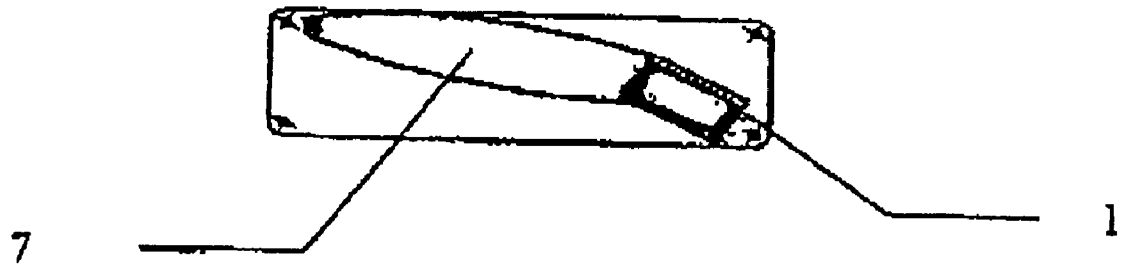
FIG. 2 shows a device as shown in FIG. 1 in outline.

FIG. 2 shows a schematic detail of the card reader. The entire card reader 22 is preferably constructed on a support plate 37, which may in turn be attached like a cover to one of the recesses 26 using a closure. A card slot 32, which is made larger than the intended ticket format, is preferably implemented on the support plate 37. A barcode scanner 31 may be positioned above the card slot 32, which scans the insertion region for the ticket 30.

The lower face of the card slot 32 is preferably equipped with a mirror 34, so that the light beams of the barcode scanner 31 are reflected and may also recognize a barcode when it is directed downward. The card slot 32 preferably projects at least partially out of the surface of the stand foot 24. The card slot 32 preferably has laterally recessed jaws, so that ticket 30 may alternately be inserted or pulled through. Furthermore, an antenna 33 for contactless chip cards may be positioned inside the card slot 32.

The second preferred embodiment according to the present invention may be equipped with electronics supports according to the present invention or may not.

Further embodiments according to the present invention only have a part of the features described, every combination of features, particularly even from different described embodiments, able to be provided.

What is claimed is:

1. A device for controlling access in a passage lane, the passage lane having a lateral delimitation and a passage direction, said device comprising:

a housing for receiving electronic components, said housing configured to be located at a lateral delimitation of the passage lane; and at least three housing openings in said housing, said housing openings configured to be closed by a respective cover, said respective cover having a respective modular electronic component attached to a surface of said cover so that said modular electronic component is replaced together with said cover when said cover is replaced, wherein the first of said covers is carrying electronic identification means for the access rights, the second of said covers is carrying an electronic station controller receiving information from the electronic identification means module and controlling means to indicate the access right.

2. The device according to claim 1, wherein at least one of said openings is adapted to have a cover attached to said housing by a quick-acting closure.

3. The device according to claim 1, wherein at least one of said covers is adapted to be attached to said housing opening by a quick-acting closure.

4. The device of claim 1, wherein said housing has a vertically extending tubular profile, said housing openings being openings in said vertically extending tubular profile.

5. The device of claim 1, wherein said cover for closing said first housing opening supports a display, said cover for closing said second housing opening supports an identification module, and said third housing opening provides access to electrical connections.

6. The device of claim 1, further comprising means in said housing for supporting an antenna; and means on one of said modular electronic components for connecting an antenna.

7. The device of claim 6, further comprising a long-range antenna for detecting contactless electronic transponders, said antenna being adapted to be connected to one of said modular electronic components.

8. The device according to claim 7, wherein said long-range antenna is configured to extend parallel to the passage direction, said device further comprising:

a support frame connected to said housing, and two spaced plates adapted to be attached to said support frame, a given one of said plates having electrically conductive shielding, said given one of said plates being adapted to be attached to the side of said support frame facing away from the passage lane.

9. The device of claim 1, wherein a cross-section of said housing extends substantially degressively from a middle portion to at least one end portion, said device further comprising a substantially level cover plate on at least one end portion of said housing, said cover plate having a card reader below said cover plate, said card reader having a feed direction for reading a card, said feed direction and the passage direction enclosing an acute angle between them.

10. The device of claim 9, further comprising means for checking validity of a card read by said card reader.

11. The device of claim 9, wherein said cross section of said housing has first and second curved longitudinal sides, each of said curved longitudinal sides having a convex middle portion.

12. The device of claim 1, further comprising a lock/release mechanism in said housing, and a barrier in a passage lane, said lock/release mechanism be adapted for locking and releasing said barrier so as to control access in said passage lane.

13. The device of claim 12, further comprising a rotating barrier in a passage lane, said rotating barrier being adapted to be locked and released by said lock/release mechanism so as to control access in said passage lane.

14. The device of claim 12, further comprising a stand having two stand feet, said two stand feet being connected by a bridge, said stand supporting said housing, and at least one card reader in said housing.

15. The device of claim 14, further comprising a second card reader, each card reader being adapted to release said lock/release mechanism so as to permit access in the passage lane in a respective passage direction.

16. The device of claim 14, further comprising a rotating barrier supported by said stand, said rotating barrier controlling access in a passage lane on a given longitudinal side of said housing in a respective passage direction.

17. The device of claim 1, wherein one of said modular electronic components is a card reader, said card reader having a card slot configured to receive a card, said card reader being configured to read said card to provide access to the passage lane, said card slot being wider than said card.

18. The device of claim 17, wherein said card slot is configured to receive a card, said card slot being wider than said card.

19. The device of claim 18, wherein said card is a ticket.

20. The device of claim 17, wherein said card reader is a barcode scanner positioned above said card slot, said barcode scanner being configured to scan a portion of said card, said card slot projecting at least partially beyond a surface of said housing.

21. The device of claim 17, further comprising a barrier in a passage lane, said card reader being positioned in front of said barrier in a given passage direction in said passage lane, said barrier having a lock/release mechanism responsive to said card reader, said lock/release mechanism being configured to control access in said passage lane in said given passage direction.

22. The device of claim 1, wherein one of said modular electronic components is a card reader, said card reader having card jaws configured to read a card, said card being configured to authorize access to the passage lane, said card jaws being configured to read a card that is pulled through said jaws.

23. The device of claim 22, wherein said card is a ticket.

24. The support device of claim 1, further comprising plug-in contacts on said modular electronic component.

25. The device of claim 1, wherein said modular electronic component is a contactless chip card reader module, said contactless chip card reader module being configured for connection to an antenna.

26. The device of claim 1, wherein said modular electronic component is a barcode read module, said cover having a recess configured to receive barcoded cards.

27. The device of claim 1, wherein said modular electronic component is a barcode read module, said cover having a recess configured to receive barcoded tickets.

28. A device according to claim 1, further comprising an electric cabling assembly within that housing having connectors arranged at the housing openings, which connectors fit into plug-in contacts on the electronic modules attached to the covers.

* * * * *